Patented Nov. 8, 1949

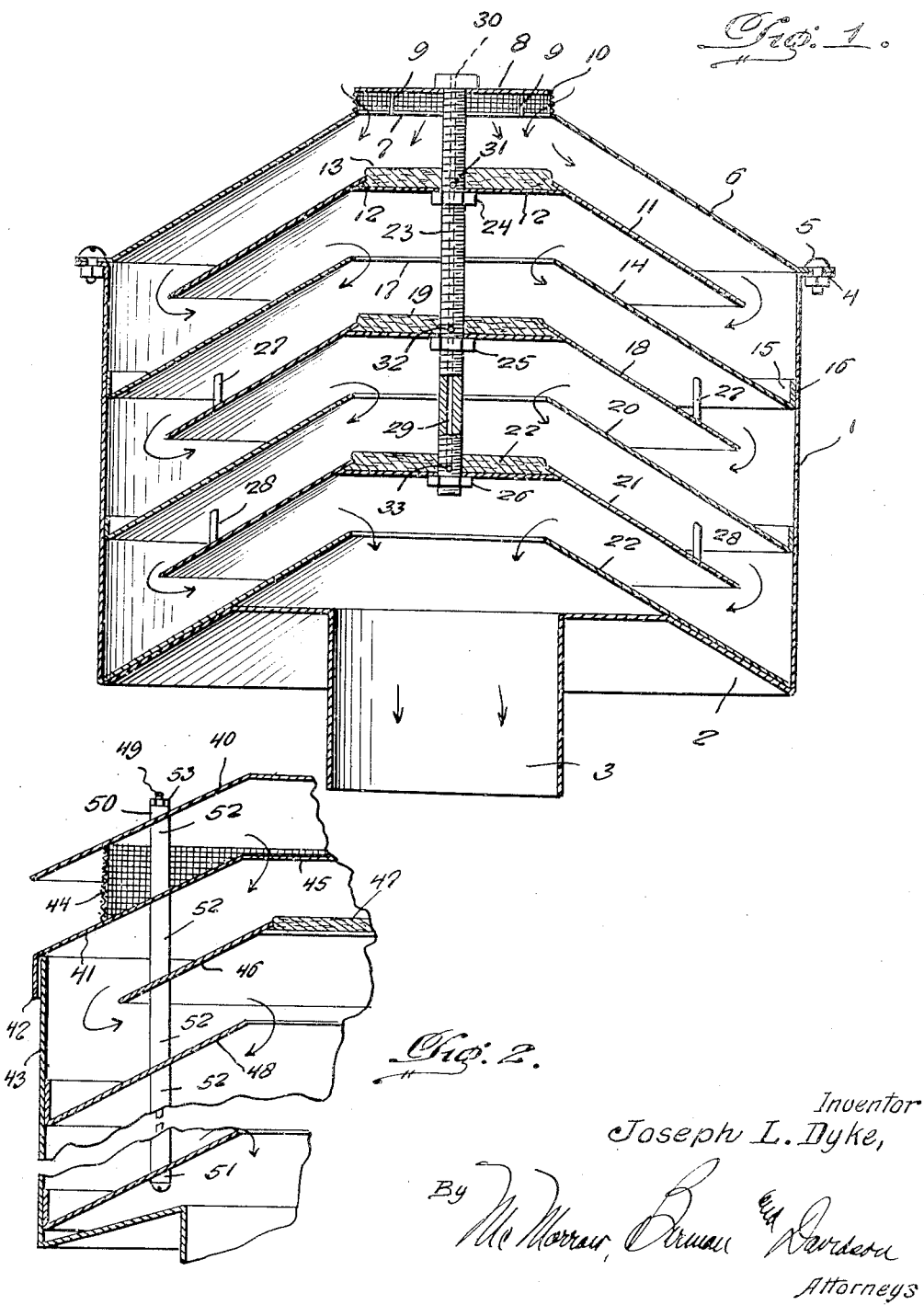

2,487,115

UNITED STATES PATENT OFFICE 2,487,115

AIR CLEANER

Joseph L. Dyke, Norfolk, Va.

Application September 25, 1945, Serial No. 618,513

2 Claims. (Cl. 183—9)

This invention relates to an air cleaner and more particularly to a device for freeing air from dust, grit and other foreign matter.

An object of this invention is to provide an improved air cleaning device adapted to be applied to the intake of an internal combustion engine and which is provided with oil covered funnel-shaped baffles to filter out foreign matter and direct the air in a tortuous path.

Another object of this invention is to provide an improved device for removing foreign particles from air having a series of baffles of inverted funnel shape and having oil reservoirs for directing oil on the baffles and having means to replenish the oil without dismantling the device.

It is a further object of this invention to provide an improved air cleaning apparatus having a transparent casing with a series of baffles therein held in proper position to direct the air in a tortuous path, and with means provided to facilitate the dismantling of the apparatus for cleaning purposes.

Other objects and advantages of the present invention will appear in the following detailed description and be particularly pointed out in the appended claims, reference being had to the accompanying drawings forming part of this specification, and in which:

Figure 1 is a cross-sectional view of an air cleaning device according to this invention showing the interior construction and the air path.

Figure 2 is a view similar to Figure 1 but showing a modification of the invention.

Referring to Figure 1, the reference numeral 1 is the outer cylindrical casing or shell of the air cleaning device, which is preferably made of a transparent plastic so that the interior will be visible from the outside. However, if desired, a metal casing may be used. The bottom of the shell is turned inwardly and upwardly at 2 and merges into a relatively narrow short pipe 3 which constitutes the outlet of the device and which is connected to the air intake of an automobile or other internal combustion engine. The upper end of the shell 1 is flanged outwardly at 4 on which is fastened by means of bolts 5, at spaced intervals, a top 6 of inverted funnel shape. The center of the top 6 is provided with an opening 7 which is shielded by a circular plate or closure cap 8 supported on struts 9 spaced along the rim of the opening 7. The shield 8 is spaced above the opening 7 to provide an annular lateral inlet for air which is covered by the reticulated side wall or screen 10.

As seen in the drawing, the interior of the shell contains a series of baffles of inverted funnel shape, the baffles being sloped about 30 degrees to the horizontal. Immediately beneath the top 6 is positioned the conical baffle 11 which is of smaller diameter than the diameter of the shell 1. The center portion of baffle 11 is flattened out and forms a cup or reservoir 12 to receive a felt, cloth or other fabric pad 13 which is impregnated with oil. It is to be noted that the pad 13 extends above the top of the cup or reservoir 12 so that some oil will flow down baffle 11 to maintain a film of oil thereon. Excess oil from baffle 11 will drop on baffle 14, positioned beneath baffle 11, and will collect in the annular pocket 15 formed by the upturned flange 16 on baffle 14. The diameter of baffle 14 is such that the flange 16 will just fit into the casing 1. The center of baffle 14 is provided with an opening 17 and beneath baffle 14 is a baffle 18 with an oil pad 19 constructed exactly the same as baffle 11 and oil pad 13. Beneath baffle 18 is a baffle 20 constructed as baffle 14, and beneath baffle 20 is another baffle 21 and oil pad 22 constructed as baffle 11 and pad 13. The last baffle shown is baffle 22 constructed like baffle 14 and resting on the bottom 2 of the casing 1. The number of baffles shown in the drawing is only by way of illustration, since it is obvious that any number, more or less, can be used in the air cleaner of this invention. Supported by the shield 8 and extending through the center of shield 8 and the baffles 11, 14, 18, 20 and 21 is a threaded bolt 23 having nuts 24, 25 and 26, for supporting the baffles 11, 18 and 21, respectively, in spaced relationship. The intermediate baffles 14 and 20 are in turn respectively supported by struts 27 and 28 extending upwardly at spaced intervals from the baffles 18 and 21, respectively. The spacing of the baffles may of course, be varied and be adjustable, and other forms of supporting means may be adopted for the baffles.

In order to provide a means for replenishing the oil in the pads 13, 19 and 22 without dismantling the device, the bolt 23 is provided with a center oil passage 29 extending through to the top of the bolt, as at 30. The radial openings 31, 32 and 33, extend from the oil passage 29 to direct oil to the pads 13, 19 and 22, respectively. To replenish the oil, it is merely necessary to drop oil into opening 30 occasionally, and the pads will absorb oil from the passage 29 through the radial openings.

In operation, the pipe 3 is connected to the air intake of the internal combustion engine. Air will be drawn in through opening 7 at the top of the cleaning device and large particles of foreign matter will be filtered out immediately by the screen 10. The air will strike the oil pad 13 and the oil covered baffle 11. The oil will catch impurities and foreign particles while the air is directed as shown by the arrows in the drawing. The air will pass around the edge of baffle 11 and be directed upwardly by the baffle 14 and then down through opening 17. The process is repeated as many times as there are sets of baffles and finally the purified air exits through the pipe 3.

When it is desired to clean the air cleaning apparatus of this invention, it is merely necessary to unscrew the bolts 5 and lift the top 6. The baffles 11, 14, 18, 20 and 21 will be lifted with the top 6 as a unit. Then by removing the nuts 26, 25 and 24, successively, the sets of baffles can be separately removed for easy cleaning.

In the embodiment of Figure 2 the top baffle plate 40 is supported in raised position with respect to the next lower baffle plate 41, baffle plate 41 being downwardly flanged at 42 so as to rest on the top edge of the main housing 43, and a screen 44 is secured between baffle plate 40 and baffle plate 41. Baffle plate 41 is provided with an air inlet opening 45. Supported below baffle plate 41 is a smaller baffle plate 46 provided with an oil pad 47 similar to oil pad 13 of Figure 1. Supported below baffle plate 46 is a large baffle plate 48 similar to baffle plate 14 of Figure 1. Supported successively below baffle plate 48 are a series of alternating small and large baffle plates, the small baffle plates carrying central oil pads.

The supporting means for the spaced baffle plates comprises a plurality of bolts, such as shown at 49 provided with upper and lower spacers 50 and 51 and intermediate spacers 52 between the adjacent baffle plates, the assembly being rigidly secured by nuts 53 on the respective bolts 49. In the embodiment of Figure 2 air enters the cleaner between baffle plates 40 and 41, passing through screen 44 and through opening 45 over oil-carrying baffle plate 46 and then through the successive stages of the cleaner as in the embodiment of Figure 1.

While certain specific embodiments of the invention have been described in the foregoing description, it will be understood that various modifications within the spirit of said invention may occur to those skilled in the art. Therefore it is intended that no limitations be placed on the invention other than as defined by the scope of the appended claims.

I claim:

1. A device for cleaning dust from air comprising an open-ended cylindrical housing, a funnel-shaped top secured to the upper end of said housing, said top having a circular opening disposed centrally therein, a closure cap mounted in fixed relation over said opening and provided with a reticulated side wall for the ingress therethrough of air partially freed of dust, a funnel-shaped bottom secured to the other end of said housing, said bottom having an opening arranged centrally therein, and filter means arranged intermediate said top and bottom for separation of the remainder of the dust from the admitted air, said filter means comprising a hollow vertically-disposed bolt adapted to contain oil dependingly carried by said closure cap, there being a plurality of horizontally-disposed openings arranged longitudinally along said bolt, a plurality of superimposed spaced baffles each of a diameter less than the internal diameter of said housing arranged intermediate said top and bottom of said housing and secured to said bolt, each of said baffles having its central portion contiguous to and spaced below one of the openings in said bolt, a second plurality of baffles having a diameter equal to the internal diameter of said housing and supported by the latter, there being an opening arranged centrally in each of said second-named baffles, each of said second-named baffles being arranged intermediate a pair of said first-named baffles to thereby form a tortuous passage for the passage of air, and means for withdrawing the dust-freed air from said housing.

2. A device for cleaning dust from air comprising an open-ended cylindrical housing, a funnel-shaped top secured to the upper end of said housing, said top having a circular opening disposed centrally therein, a closure cap mounted in fixed relation over said opening and provided with a reticulated side wall for the ingress therethrough of air partially free of dust, a funnel-shaped bottom secured to the other end of said housing, said bottom having an opening arranged centrally therein, and filter means arranged intermediate said top and said bottom for separation of the remainder of the dust from the admitted air, said filter means comprising a hollow vertically-disposed bolt adapted to contain oil dependingly carried by said closure cap, there being a plurality of horizontally-disposed openings arranged longitudinally along said bolt, a plurality of superimposed spaced baffles each of a diameter less than the internal diameter of said housing arranged intermediate said top and bottom of said housing and secured to said bolt, each of said baffles having its central portion contiguous to and spaced below one of the openings in said bolt, each of the central portions having a pad resting thereon for conveying the oil injected through the openings in said bolt over said baffles, a second plurality of baffles having a diameter equal to the internal diameter of said housing, and supported by the latter, there being an opening arranged centrally in each of said second-named baffles, said second-named baffles being arranged intermediate a pair of said first-named baffles to thereby form a tortuous passageway for the passage of air therethrough, and means for withdrawing the dust-free air from said housing.

JOSEPH L. DYKE.

REFERENCES CITED

The following references are of record in the file of this patent:

UNITED STATES PATENTS

| Number | Name | Date |
| --- | --- | --- |
| 1,390,096 | Di Sante | Sept. 6, 1921 |
| 1,637,597 | Ulrici | Aug. 2, 1927 |
| 1,674,764 | Dauphinee | June 26, 1928 |
| 1,769,072 | Raney | July 1, 1930 |
| 1,934,619 | Canter | Nov. 7, 1933 |
| 1,988,262 | Burckhalter et al. | Jan. 15, 1935 |
| 2,001,259 | Lucke | May 14, 1935 |